(12) United States Patent
Kim (10) Patent No.: US 12,119,466 B2
(45) Date of Patent: Oct. 15, 2024

(54) BATTERY PACK MANUFACTURING METHOD

(71) Applicant: LG Chem, Ltd., Seoul (KR)

(72) Inventor: Gwan Woo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 886 days.

(21) Appl. No.: 17/267,694

(22) PCT Filed: Jan. 6, 2020

(86) PCT No.: PCT/KR2020/000218
§ 371 (c)(1),
(2) Date: Feb. 10, 2021

(87) PCT Pub. No.: WO2020/145602
PCT Pub. Date: Jul. 16, 2020

(65) Prior Publication Data
US 2021/0328284 A1    Oct. 21, 2021

(30) Foreign Application Priority Data
Jan. 10, 2019   (KR) .......................... 10-2019-0003263

(51) Int. Cl.
*H01M 10/653* (2014.01)
*G01B 11/02* (2006.01)
(Continued)

(52) U.S. Cl.
CPC ........... *H01M 10/653* (2015.04); *G01B 11/02* (2013.01); *G06T 7/60* (2013.01); *H01M 10/613* (2015.04);
(Continued)

(58) Field of Classification Search
CPC ............. H01M 10/653; H01M 10/613; H01M 10/647; H01M 10/6551; H01M 10/6554;
(Continued)

(56) References Cited

U.S. PATENT DOCUMENTS 5,663,007 A * 9/1997 Ikoma ............... H01M 10/6563
429/151
2011/0045335 A1 2/2011 Lee et al.
(Continued)

FOREIGN PATENT DOCUMENTS

CN 105493309 A 4/2016
CN 107068921 A 8/2017
(Continued)

OTHER PUBLICATIONS

Search Report dated Sep. 27, 23 from Office Action for Chinese Application No. 202080004469.6 issued Sep. 29, 2023, 3 pages.
(Continued)

*Primary Examiner* — Jeffrey T Carley
(74) *Attorney, Agent, or Firm* — Lerner David LLP (57) ABSTRACT

A battery pack manufacturing method includes (a) stacking battery cells to form a cell stack, (b) coupling the cell stack and a U-frame to each other, (c) measuring the volume of the space between a flat plate coupled to the U-frame and the cell stack, and (d) applying a polymer resin corresponding in amount to the volume measured in step (c).

13 Claims, 5 Drawing Sheets

(51) Int. Cl.
  *G06T 7/60* (2017.01)
  *H01M 10/613* (2014.01)
  *H01M 10/647* (2014.01)
  *H01M 10/6551* (2014.01)
  *H01M 10/6554* (2014.01)
  *H01M 50/204* (2021.01)
  *H01M 50/209* (2021.01)
  *H01M 50/293* (2021.01)

(52) U.S. Cl.
  CPC ..... *H01M 10/647* (2015.04); *H01M 10/6551* (2015.04); *H01M 10/6554* (2015.04); *H01M 50/204* (2021.01); *H01M 50/209* (2021.01); *H01M 50/293* (2021.01)

(58) Field of Classification Search
  CPC ............. H01M 50/209; H01M 50/293; H01M 50/204; G01B 11/02; G06T 7/60
  See application file for complete search history.

(56) References Cited

U.S. PATENT DOCUMENTS

| | | | |
|---|---|---|---|
| 2011/0090614 A1 | 4/2011 | Guerin et al. | |
| 2016/0197386 A1 | 7/2016 | Moon et al. | |
| 2018/0076493 A1* | 3/2018 | Park | H01M 50/227 |
| 2018/0183117 A1* | 6/2018 | Cho | H01M 50/24 |
| 2018/0269485 A1* | 9/2018 | Yoo | H01M 4/625 |
| 2019/0273246 A1* | 9/2019 | Kono | H01M 4/622 |
| 2020/0176743 A1* | 6/2020 | Chen | H01M 50/489 |
| 2020/0185797 A1 | 6/2020 | Park et al. | |
| 2020/0313132 A1* | 10/2020 | Rangelov | E04H 5/04 |
| 2021/0057689 A1 | 2/2021 | Park et al. | |
| 2022/0238935 A1 | 7/2022 | Tolk et al. | |

FOREIGN PATENT DOCUMENTS

| | | | | |
|---|---|---|---|---|
| CN | 113678305 A | | 11/2021 | |
| DE | 102016115828 A1 | * | 3/2018 | |
| DE | 102018005234 A1 | | 1/2019 | |
| EP | 3246978 A1 | | 11/2017 | |
| EP | 3979385 A1 | * | 4/2022 | ........ H01M 10/0525 |
| FI | 20215112 A1 | * | 8/2022 | |
| JP | H10209206 A | | 8/1998 | |
| JP | 2004139924 A | | 5/2004 | |
| JP | 2011508366 A | | 3/2011 | |
| JP | 2012204040 A | | 10/2012 | |
| JP | 2013051121 A | | 3/2013 | |
| JP | 2013191388 A | * | 9/2013 | |
| JP | 2014086342 A | | 5/2014 | |
| JP | 2014103123 A | | 6/2014 | |
| JP | 5675890 B2 | * | 2/2015 | .......... H01M 8/0258 |
| JP | 2015022994 A | | 2/2015 | |
| JP | 2018510463 A | | 4/2018 | |
| KR | 20060071813 A | | 6/2006 | |
| KR | 20150044231 A | | 4/2015 | |
| KR | 20150049521 A | | 5/2015 | |
| KR | 101636378 B1 | | 7/2016 | |
| KR | 20160105354 A | | 9/2016 | |
| KR | 20160105357 A | | 9/2016 | |
| KR | 101709563 B1 | | 2/2017 | |
| KR | 20180071800 A | | 6/2018 | |
| KR | 20200096605 A | * | 8/2020 | |
| WO | WO-2016137303 A1 | * | 9/2016 | .............. B60L 50/64 |
| WO | WO-2016200231 A1 | * | 12/2016 | .......... H01M 10/613 |
| WO | WO-2019107562 A1 | * | 6/2019 | .......... H01M 10/613 |
| WO | 2020116825 A1 | | 6/2020 | |
| WO | 2020212066 A1 | | 10/2020 | |

OTHER PUBLICATIONS

Extended European Search Report including Written Opinion for Application No. 20738739.0 dated Jun. 30, 2022, pp. 1-12.
International Search Report for Application No. PCT/KR2020/000218, dated Apr. 16, 2020, 2 pages.
Partial Search Report for European Application No. 20738739.0 dated Oct. 28, 2021. 2 pgs.

* cited by examiner

BATTERY PACK MANUFACTURING METHOD

CROSS-REFERENCE TO RELATED APPLICATIONS

This application is a national phase entry under 35 U.S.C. § 371 of International Application No. PCT/KR2020/000218 filed Jan. 6, 2020, which claims priority from Korean Patent Application No. 2019-0003263 filed on Jan. 10, 2019, the disclosure of which is hereby incorporated by reference herein its entirety.

TECHNICAL FIELD

The present invention relates to a battery pack manufacturing method, and more particularly to a battery pack manufacturing method including a process of measuring an appropriate amount of polymer resin serving as a thermal conductor between a battery cell and a battery pack housing.

BACKGROUND ART

In recent years, secondary batteries, which are capable of being charged and discharged, have been widely used as energy sources of wireless mobile devices. In addition, secondary batteries have also attracted considerable attention as power sources for an electric vehicle (EV), a hybrid electric vehicle (HEV), and a plug-in hybrid electric vehicle (Plug-In HEV), which have been proposed to solve problems, such as air pollution, caused by existing gasoline and diesel vehicles using fossil fuels.

The operating voltage necessary to operate each small-sized mobile device is low; however, a medium- or large-sized device, such as a vehicle, requires a high-output, large-capacity energy source. For this reason, a medium- or large-sized battery module or battery pack including a plurality of battery cells electrically connected to each other is used.

Each of the battery cells constituting the medium- or large-sized battery module or battery pack may be a secondary battery capable of being charged and discharged. In the case in which the secondary battery has high output and large capacity, however, a large amount of heat is generated during charging and discharging of the secondary battery. In the case in which the heat generated during charging and discharging of the secondary battery is not effectively removed, a degradation phenomenon is accelerated, and the secondary battery may catch fire or explode depending on circumstances.

In order to prevent this, a method of filling an empty space between the battery cells and a battery pack housing with a thermally conductive polymer resin to remove heat from the battery pack is used. In the case in which the injection amount of thermally conductive polymer resin is too small, however, it is difficult to exhibit a thermal conduction function, which is undesirable. In the case in which the injection amount of thermally conductive polymer resin is too large, the thermally conductive polymer resin may overflow due to excessive injection, which is also undesirable.

In connection therewith, Patent Document 1 discloses a module housing for manufacturing unit modules configured to have a structure in which at least one of a first cover member or a second cover member that are coupled to each other while wrapping the entirety of outer surfaces of battery cells is made of a thermally conductive resin and in which heat generated in the battery cells is conducted to the first cover member and the second cover member.

However, Patent Document 1 does not disclose a method of setting the injection amount of thermally conductive resin.

Patent Document 2 discloses a battery module including a module case having a lower plate and sidewalls defining an inner space thereof, a plurality of battery cells disposed in the inner space of the module case, and a resin layer disposed in the inner space of the module case, wherein the resin layer is in contact with the plurality of battery cells and is also in contact with the lower plate or the sidewalls of the module case.

According to the disclosure of Patent Document 2, an injection hole configured to allow a material necessary to form the resin layer to be injected therethrough is included, and an observation hole is formed in the distal end of the lower plate, in which the injection hole is formed, whereby it is possible to observe whether the material is successfully injected. That is, Patent Document 2 discloses a method of injecting the material necessary to form the resin layer and at the same time directly observing injection of the material.

Patent Document 3 discloses a battery module configured such that a resin injection hole configured to allow a resin for adhesion to be injected therethrough is formed in at least one of opposite side surfaces of a mono frame having therein an inner space in which a cell stack is received.

Patent Document 3 discloses a structure in which the resin for adhesion is injected into the space between the mono frame and the cell stack, but does not disclose a method of setting the injection amount of resin for adhesion.

Therefore, there is a high necessity for technology capable of filling the space between the housing and the cell stack with a polymer resin while the conventional battery pack and battery module are used without modification, thereby improving efficiency in cooling of the battery pack, and of setting the amount of polymer resin necessary to fill the space between the housing and the cell stack.

PRIOR ART DOCUMENT

Patent Document 1—Korean Registered Patent Publication No. 1636378 (2016 Jun. 29)
Patent Document 2—Korean Patent Application Publication No. 2016-0105354 (2016 Sep. 6)
Patent Document 3—Korean Patent Application Publication No. 2018-0071800 (2018 Jun. 28)

DISCLOSURE

Technical Problem

The present invention has been made in view of the above problems, and it is an object of the present invention to provide a battery pack manufacturing method capable of setting an appropriate amount of polymer resin with which an empty space defined between a cell stack and a flat plate is filled in order to improve the cooling function of the battery pack.

Technical Solution

An embodiment of the present invention capable of accomplishing the above object may be a battery pack manufacturing method including (a) stacking battery cells to form a cell stack, (b) coupling the cell stack and a U-frame to each other, (c) measuring the volume of the space between a flat plate coupled to the U-frame and the cell stack, and (d) applying a polymer resin corresponding in amount to the volume measured in step (c).

Specifically, step (d) may include a process of applying the polymer resin to the inner surface of the flat plate.

In addition, step (c) may include a process of capturing the contour of the cell stack using a fluoroscopic imaging apparatus.

In addition, step (c) may include a process of capturing positions of a maximum protrusion and a minimum protrusion of the cell stack and calculating a protruding length tolerance between the protrusions.

In addition, step (c) may include a process of measuring the length from the contour of the cell stack to the end of the U-frame.

In addition, step (c) may include a process of measuring the length between the flat plate and the cell stack to calculate a correction length and multiplying the correction length by the area of the cell stack.

In addition, the correction length (Z') between the flat plate and the cell stack may be the average of the maximum value and the minimum value calculated by reflecting a tolerance range in the length between the flat plate and the cell stack, defined by a formula below.

$$Z=(M0+M1-M2)$$

In the above formula, Z indicates the length between the flat plate and the cell stack, M0 indicates the distance between the maximum protrusion and the minimum protrusion of the cell stack, M1 indicates the length from the maximum protrusion of the cell stack to the end of the sidewall of the U-frame, and M2 indicates the step difference between the portion of the flat plate to which the polymer resin is applied and the portion of the flat plate to which the U-frame is coupled.

Step (b) may include a process of coupling the U-frame and the cell stack to each other such that the U-frame wraps the upper surface and the side surface of the cell stack, and the cell stack coupled to the U-frame may be disposed such that a base of the U-frame faces the ground surface.

In addition, the battery pack manufacturing method may further include (e) welding the U-frame and the flat plate to each other.

The welding may be performed in the state in which the flat plate is disposed in tight contact with the end of the U-frame by pushing the flat plate downwards.

The pushing the flat plate downwards may include a process of compressing the U-frame in the direction in which a first sidewall and a second sidewall of the U-frame face each other.

The polymer resin may be a thermally conductive polymer resin.

In addition, the present invention provides a battery pack manufactured using the battery pack manufacturing method.

The battery pack may include a cell stack constituted by stacking a plurality of battery cells, a U-frame configured to receive the cell stack therein, a flat plate coupled to major-axis directional ends of opposite sidewalls of the U-frame, and end plates coupled to minor-axis directional ends of the opposite sidewalls and a base of the U-frame, wherein the space between the flat plate and the cell stack may be filled with a polymer resin, and a correction length (Z') between the flat plate and the cell stack may be the average of the maximum value and the minimum value calculated by reflecting a tolerance range in the length between the flat plate and the cell stack, defined by a formula below.

$$Z=(M0+M1-M2)$$

In the above formula, Z indicates the length between the flat plate and the cell stack, M0 indicates the distance between a maximum protrusion and a minimum protrusion of the cell stack, M1 indicates the length from the maximum protrusion of the cell stack to the end of the sidewall of the U-frame, and M2 indicates the step difference between the portion of the flat plate to which the polymer resin is applied and the portion of the flat plate to which the U-frame is coupled.

BEST MODE

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numerals will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that the other elements may be further included unless mentioned otherwise.

The present invention will be described with reference to the drawings showing detailed embodiments thereof.

Figure 1:
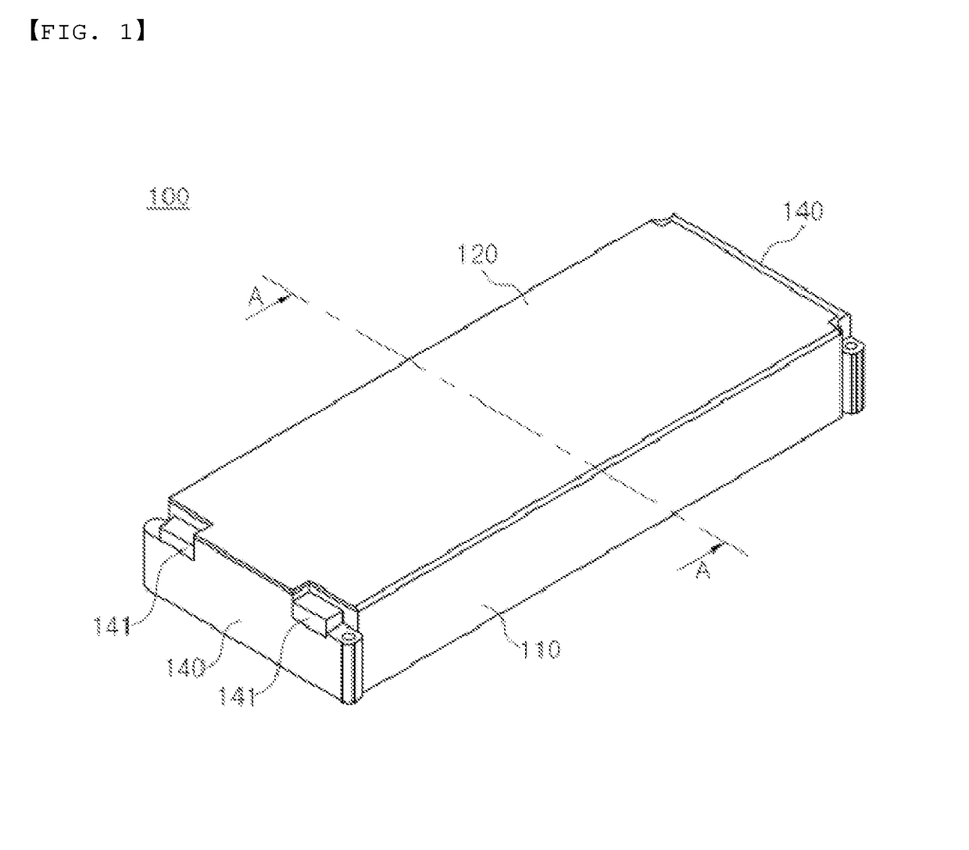
FIG. 1 is a perspective view of a battery pack.

FIG. 1 is a perspective view of a battery pack.

Referring to FIG. 1, the battery pack 100 includes a U-frame 110 configured to receive a cell stack constituted by stacked unit cells therein, the U-frame 110 being configured to wrap opposite side surfaces and the lower surface of the cell stack; a flat plate 120 coupled to the U-frame 110 at the upper part thereof; and an end plate 140 connected to an electrode lead of the cell stack, the end plate 140 being configured to hermetically seal each open surface of an assembly of the U-frame and the flat plate. The detailed shape of each of the U-frame 110, the flat plate 120, and the end plate 140 is not limited to the structure shown in FIG. 1.

An electrode terminal 141 connected to the electrode lead of the cell stack is exposed outside through the end plate 140, and the electrode terminal 141 may be electrically connected to an external device.

The battery pack 100 is configured to have a structure in which a space is formed between the flat plate 120 and the cell stack. In the case in which the space is empty, it may be difficult to discharge to the outside the thermal energy generated and accumulated during charging and discharging processes of battery cells in the battery pack.

Preferably, therefore, the space is filled with a polymer resin in order to smoothly discharge the thermal energy.

Preferably, the polymer resin is a thermally conductive polymer resin in order to improve the effect of discharging the thermal energy in the battery pack.

Figure 2:
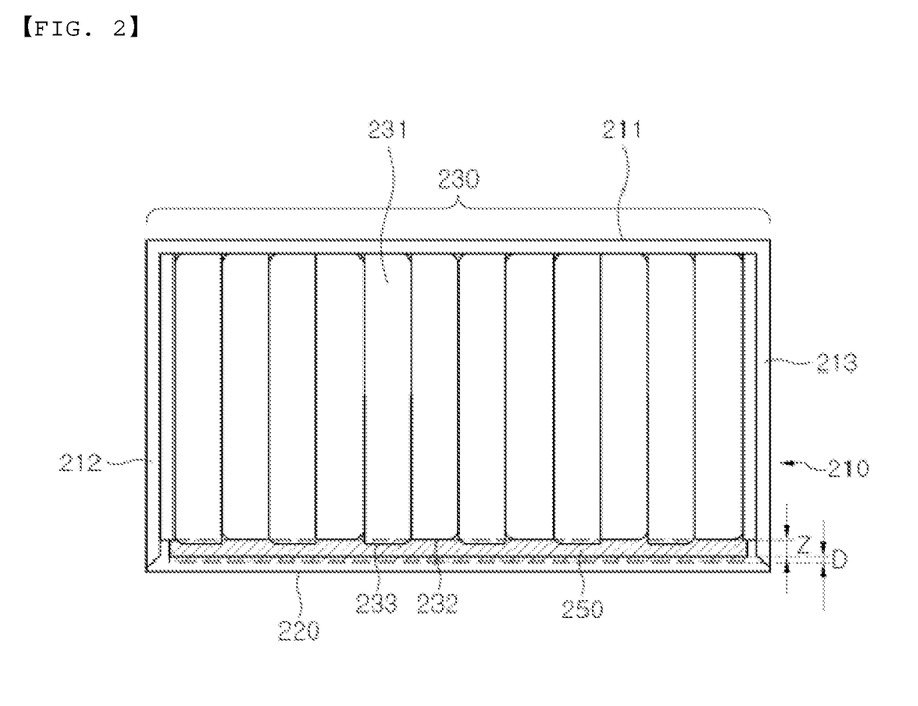
FIG. 2 is a vertical sectional view showing the state in which a conventional polymer resin is injected.

In connection therewith, FIG. 2 is a vertical sectional view showing the state in which a conventional polymer resin is injected.

Referring to FIG. 2, a plurality of pouch-shaped battery cells 231 is arranged in tight contact with each other to constitute a cell stack 230, and the cell stack 230 is disposed in tight contact with the inner surfaces of a base 211, a first sidewall 212, and a second sidewall 213 of a U-frame 210.

The space between the cell stack 230 and a flat plate 220 may be filled with a polymer resin 250. FIG. 2 shows the state in which the thickness Z of the polymer resin 250 is set as the length from a minimum protrusion 232 of the cell stack 230 to the flat plate 220 and in which the product of the thickness of the polymer resin and the area of the cell stack is calculated and applied as the volume of the polymer resin.

That is, FIG. 2 shows the state in which the polymer resin is excessively injected by the thickness D of a surplus of the polymer resin.

The case in which the thickness Z of the thermally conductive polymer resin 250 is set, as shown in FIG. 2, is the case in which the injection amount of thermally conductive polymer resin is the maximum. In this case, the surplus of the polymer resin that is not received in the space between the flat plate and the cell stack remains around a battery pack at the time of sealing the battery pack, whereby sealability may be deteriorated, and when the surplus of the polymer resin is discharged from the battery pack, it may be necessary to additionally perform a process of removing the same.

In the case in which the thickness Z of the thermally conductive polymer resin 250 is set as the length from a maximum protrusion 233 of the cell stack 230 to the flat plate 220, on the other hand, is the case in which the injection amount of thermally conductive polymer resin is the minimum. In this case, the space between the cell stack 230 and the flat plate 220 is not completely filled with the polymer resin, and therefore an empty space remains. In this case, it may not be possible to avoid a problem in that thermal conductivity of the battery pack is low.

That is, on the assumption that the area of the cell stack 230 is uniform, the amount of thermally conductive polymer resin that is injected may be varied depending on the value that is used as the length from the flat plate 220 to the cell stack 230.

Accordingly, a battery pack manufacturing method according to the present invention includes a step of measuring the volume of the space between the flat plate coupled to the U-frame and the cell stack in order to accurately set the injection amount of thermally conductive polymer resin.

Figure 3:
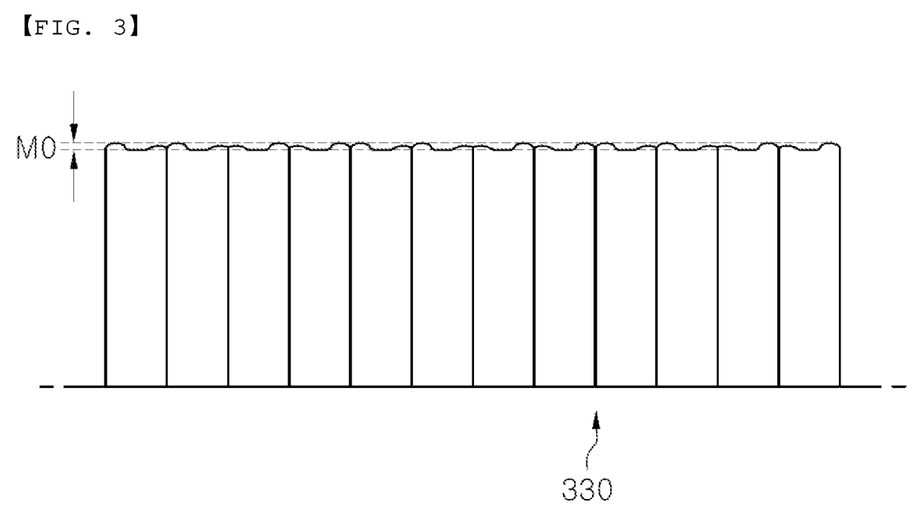
FIG. 3 is a vertical sectional view of a cell stack taken along line A-A of FIG. 1.
Figure 4:
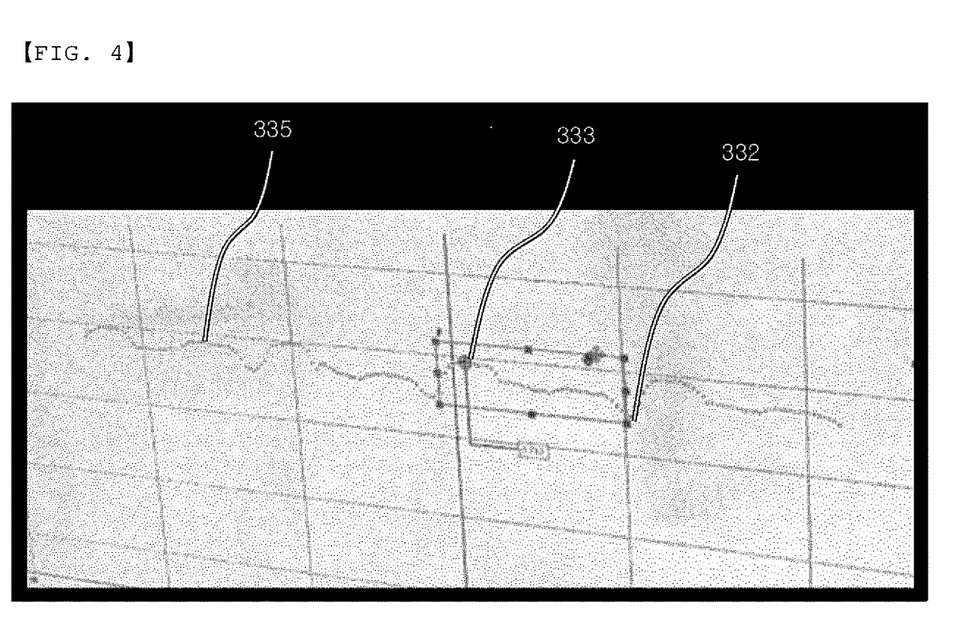
FIG. 4 is a photograph showing the contour of a cell stack captured using a fluoroscopic imaging apparatus.

In connection therewith, FIG. 3 is a vertical sectional view of the cell stack taken along line A-A of FIG. 1, and FIG. 4 is a photograph showing the contour of the cell stack captured using a fluoroscopic imaging apparatus.

Referring to FIGS. 3 and 4, a portion of the upper part of the cell stack 330 of FIG. 3 may be captured using the fluoroscopic imaging apparatus, whereby the contour 335 of FIG. 4 may be acquired.

The kind of the fluoroscopic imaging apparatus is not particularly restricted as long as the fluoroscopic imaging apparatus is used in the related technical field.

As shown in FIGS. 3 and 4, the contour 335 of the cell stack 330 is not a straight line but has a form in which protrusions and cavities are continuously arranged, and the size of the distance M0 between a maximum protrusion 333 and a minimum protrusion 332 of the cell stack may be equal to or greater than 0.

Since the contour 335 of the cell stack 330 is not a horizontal line, as described above, it is difficult to set an appropriate injection amount of polymer resin. In the case in which the method according to the present invention is used, however, it is possible to accurately measure the amount of polymer resin that is injected.

That is, in the case in which a correction value of the length from the measured contour of the cell stack 330 to the end of the sidewall of the U-frame is calculated, as shown in FIG. 4, and the correction value is multiplied by the area of the cell stack, it is possible to acquire the injection amount of polymer resin corresponding to the volume of the space to be filled with the polymer resin.

Figure 5:
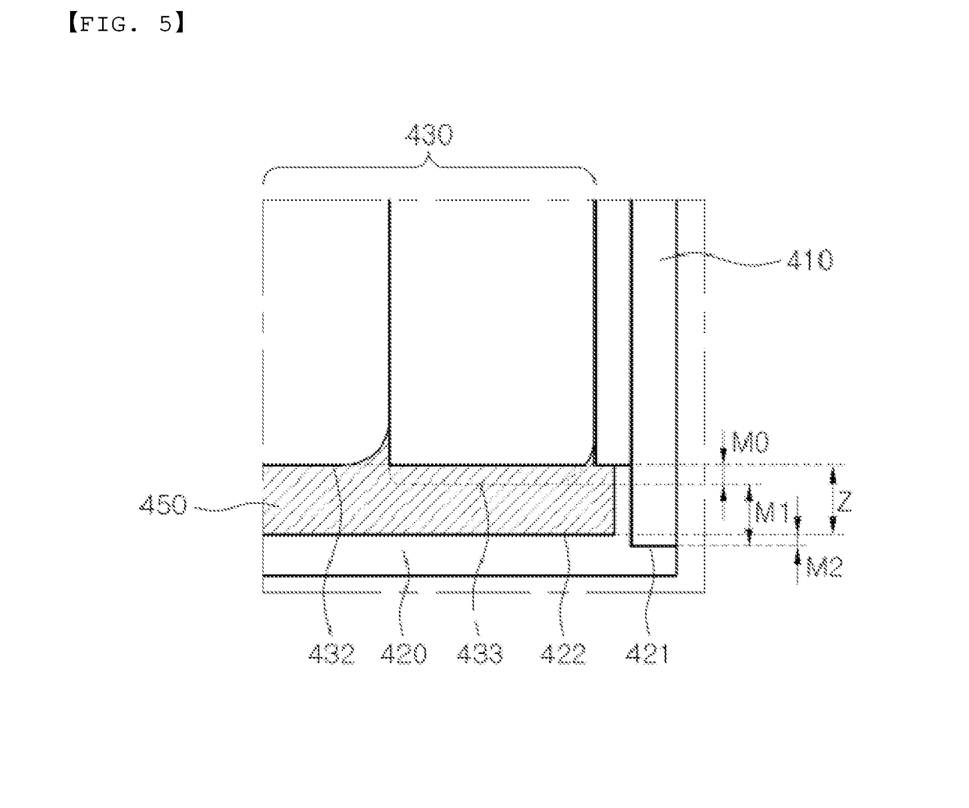
FIG. 5 is a partial vertical sectional view of a battery pack, showing a variable in a calculation formula of the injection amount of a polymer resin according to the present invention.

FIG. 5 is a partial vertical sectional view of a battery pack, showing a variable in a calculation formula of the injection amount of a polymer resin according to the present invention.

Referring to FIG. 5, a U-frame 410 and a flat plate 420 are coupled to each other, and a cell stack 430 is received therein.

The space between the cell stack 430 and the flat plate 420 is filled with a polymer resin 450. The amount of polymer resin 450 corresponding to the volume of the space may be calculated using a correction length Z' calculated based on the average of the maximum value and the minimum value calculated by reflecting a tolerance range in the length Z between the end of the sidewall of the U-frame 410 and the cell stack, expressed as lengths M0, M1, and M2 shown in FIG. 5. The detailed calculation formula is as follows.

$$Z=(M0+M1-M2)$$

In the above formula, Z indicates the length between the end of the sidewall of the U-frame and the cell stack, M0 indicates the distance between a maximum protrusion 433 and a minimum protrusion 432 of the cell stack 430, M1 indicates the length from the maximum protrusion 433 of the cell stack to the end of the sidewall of the U-frame, and M2 indicates the step difference between the portion 422 of the flat plate to which the polymer resin is applied and the portion 421 of the flat plate to which the U-frame is coupled.

In order to accurately set the injection amount of polymer resin, as in the present invention, the maximum value and the minimum value are calculated by reflecting the tolerance range of M0, M1, and M2 in the value Z calculated according to the above formula, and then the average of the maximum value and the minimum value is calculated. That is, the average is the correction length Z' of the length Z between the flat plate and the cell stack. In the case in which the correction length Z' is multiplied by the area of the cell stack, the volume of the space between the flat plate and the cell stack may be calculated, and when a polymer resin corresponding in amount to the volume of the space is injected, the surplus space between the flat plate and the cell stack may be completely filled with the polymer resin.

Particularly, in the case in which a thermally conductive polymer resin is used as the polymer resin, it is possible to provide a battery pack exhibiting a function of discharging thermal energy generated in the cell stack to the outside.

Figure 6:
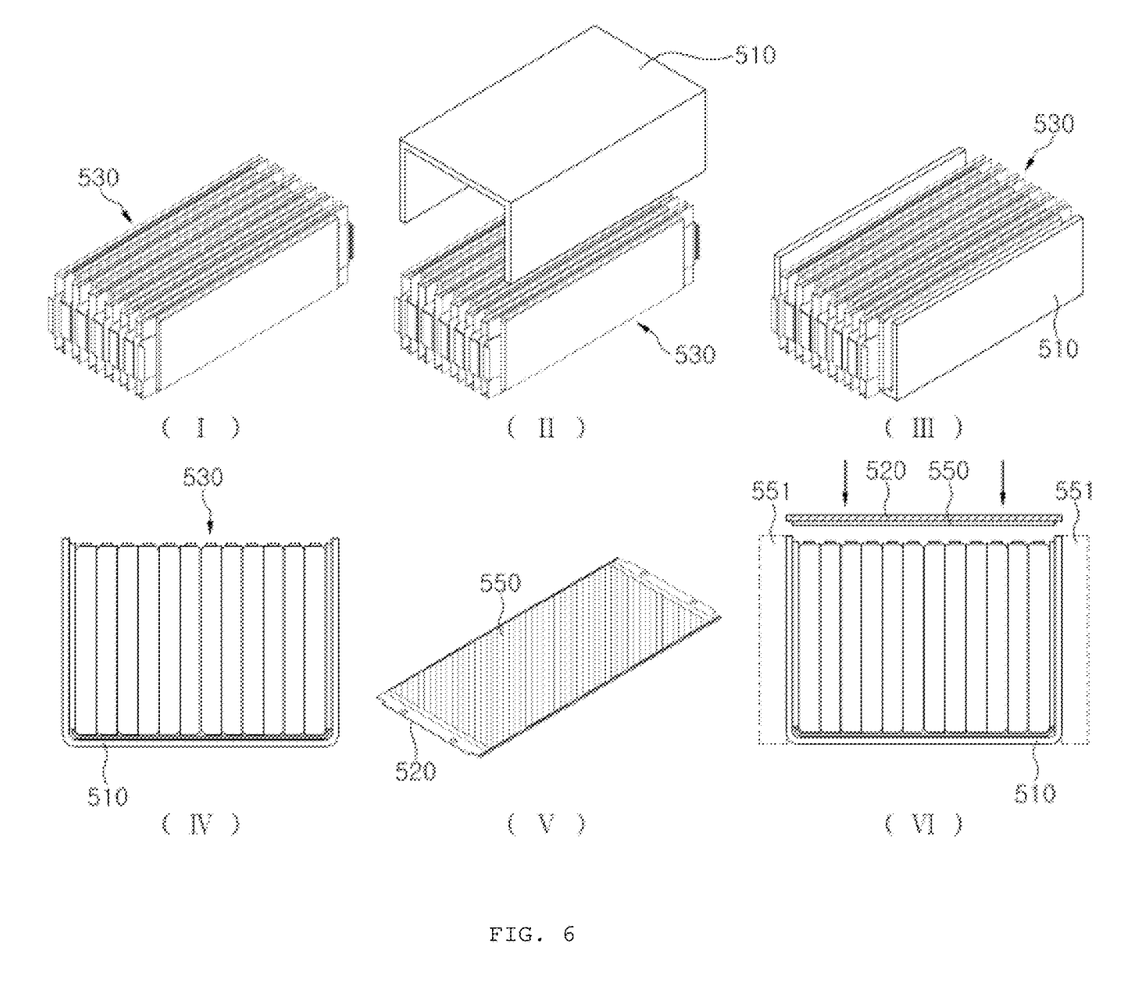
FIG. 6 is a view sequentially showing a battery pack manufacturing method according to the present invention.

A battery pack manufacturing method including a process of capturing the contour of a cell stack using a fluoroscopic imaging apparatus according to the present invention is sequentially shown in FIG. 6.

Referring to FIG. 6, as shown in FIG. 6(I), battery cells are stacked in the state of being erected vertically and are arranged in tight contact with each other to form a cell stack 530. As shown in FIG. 6(II), a U-frame 510 is coupled to the cell stack 530 so as to wrap the cell stack 530 such that the base of the U-frame 510 abuts the upper surface of the cell stack 530 and the first sidewall and the second sidewall of the U-frame 510 abut the side surfaces of the cell stack 530 in the state in which the cell stack 530 is placed on the ground surface.

As shown in FIG. 6(III), an assembly of the cell stack 530 and the U-frame 510 is rotated 180 degrees from the ground surface such that the base of the U-frame faces the ground surface and the exposed surface of the cell stack 530 faces upwards.

In the state shown in FIG. 6(IV), the contour of the exposed upper part of the cell stack 530 is calculated using a fluoroscopic imaging apparatus, and a protruding length tolerance M0 between a maximum protrusion and a minimum protrusion of the cell stack 530 is calculated. In addition, the length M1 from the maximum protrusion of the cell stack 530 to the end of the first sidewall and the second sidewall of the U-frame 510 is measured.

In addition, separately, the step difference M2 between the portion of the flat plate to which a polymer resin is applied and the portion of the flat plate to which the U-frame is coupled is measured.

After the injection amount of thermally conductive polymer resin is calculated, as described above, a polymer resin 550 is applied to a flat plate 520, as shown in FIG. 6(V).

The kind of the polymer resin is not particularly restricted as long as the polymer resin is a resin exhibiting high thermal conductivity, and the polymer resin may be used either alone or in the form of a mixture of two or more polymer resins.

For example, the polymer resin may be made of at least one selected from the group consisting of silicone, urethane, and acryl, which are mainly used for a thermally conductive pad, a gap filler, and the like.

The flat plate 520 is disposed so as to face the exposed surface of the cell stack 530 received in the U-frame, and then abutting portions of the U-frame 510 and the flat plate 520 are coupled to each other by welding.

At this time, a process of pushing the upper surface of the flat plate toward the cell stack to align welded surfaces may be included, and, in order to prevent the first sidewall and the second sidewall of the U-frame from being widened by pushing, supports 551 may be disposed outside the first sidewall and the second sidewall, the supports 551 being configured to inhibit narrowing of the first sidewall and the second sidewall toward the cell stack or widening the first sidewall and the second sidewall away from the cell stack.

Hereinafter, the present invention will be described with reference to the following example. However, the example is provided only for illustration of the present invention and should not be construed as limiting the scope of the present invention.

As shown in FIG. 5, the values of M0, M1, and M2 were measured. In particular, the distance M0 between the maximum protrusion and the minimum protrusion of the cell stack and the length M1 from the maximum protrusion of the cell stack to the end of the sidewall of the U-frame were measured using a vision system from COGNEX.

The tolerance may be a tolerance of a product itself, such as the cell stack or the U-frame, or may be a tolerance that occurs in the assembly process.

The measured values of M0, M1, and M2 and the tolerance range are shown in Table 1 below. The minimum value 1.8 of the result of tolerance analysis is a value in the case in which M0 and M1 are the minimum values and M2 is the maximum value, and the maximum value 3.1 of the result of tolerance analysis is a value in the case in which M0 and M1 are the maximum values and M2 is the minimum value.

In addition, the correction length Z' is the average of the maximum value and the minimum value.

TABLE 1

| Factor | | Length | Tolerance |
|---|---|---|---|
| M0 | 1 | 0 | +0.5 |
| M1 | 1 | 2.4 | ±0.2 |
| M2 | −1 | 0.2 | ±0.2 |
| Z | −1 | 2.2 | |
| Result of tolerance analysis | | Minimum value | 1.8 |
| | | Correction length (Z') | 2.45 |
| | | Maximum value | 3.1 |

In the case in which the result of tolerance analysis calculated as described above is multiplied by the area of the cell stack, the result of calculation of injection amount of thermally conductive polymer resin is as follows.

TABLE 2

| Area of the cell stack | | Length | Weight (g) |
|---|---|---|---|
| 418.6 * 206.25 mm | Minimum value | 1.8 | 466 |
| | Correction length (Z') | 2.45 | 634 |
| | Maximum value | 3.1 | 803 |

When analyzing the result of Table 2 above, 803 g is necessary in the case in which the injection amount of thermally conductive polymer resin is set using the maximum value, as in a conventional method, but sealing is possible using 634 g in the case in which the correction length is used, as in the present invention, whereby saving of about 21% is possible.

Consequently, it is possible to reduce the amount of thermally conductive polymer resin that may be unnecessarily wasted and to prevent deterioration in sealability of the battery pack due to a surplus thermally conductive polymer resin.

A person having ordinary skill in the art to which the present invention pertains will appreciate that various applications and modifications are possible based on the above description without departing from the scope of the present invention.

DESCRIPTION OF REFERENCE SYMBOLS

100: Battery pack
110, 210, 410, 510: U-frames
120, 220, 420, 520: Flat plates 140: End plates
141: Electrode terminal
211: Base
212: First sidewall
213: Second sidewall
230, 330, 430, 530: Cell stacks
231: Pouch-shaped battery cell
232, 332, 432: Minimum protrusions
233, 333, 433: Maximum protrusions
335: Contour of cell stack
250, 450, 550: Polymer resins
421: Portion to which U-frame is coupled
422: Portion to which polymer resin is applied
551: Support
Z: Length between flat plate and cell stack
Z': Correction length of length between flat plate and cell stack
D: Thickness of surplus of polymer resin
M0: Distance between minimum protrusion and maximum protrusion of cell stack
M1: Length from maximum protrusion of cell stack to end of sidewall of U-frame
M2: Step difference between portion of flat plate to which polymer resin is applied and portion of flat plate to which U-frame is coupled

INDUSTRIAL APPLICABILITY

As is apparent from the above description, the battery pack manufacturing method according to the present invention is capable of accurately setting the injection amount of polymer resin with which an empty space defined between the cell stack and the battery pack housing frame is filled.

Therefore, the injection amount of polymer resin is small, whereby it is possible to prevent deterioration in heat dissipation effect of the battery pack and to solve the problem of excessively injected polymer resin overflowing.

In addition, it is possible to prevent the weight of the battery pack from being increased more than necessary due to excessive injection of the polymer resin.

The invention claimed is:

1. A battery pack manufacturing method comprising:
   (a) stacking battery cells to form a cell stack;
   (b) coupling the cell stack and a U-frame to each other;
   (c) measuring a volume of a space bounded in a height dimension by a lower surface of the cell stack and a flat plate coupled to free ends of opposing sidewalls of the U-frame, the space bounded in a width dimension by the opposing sidewalls of the U-frame, and the space bounded in a length dimension by end plates coupled to opposing ends of the U-frame in the length dimension; and
   (d) applying an amount of a polymer resin to fill the volume measured in step (c).

2. The battery pack manufacturing method according to claim 1, wherein step (d) comprises applying the polymer resin to an inner surface of the flat plate.

3. The battery pack manufacturing method according to claim 1, wherein step (c) comprises determining a contour of the lower surface of the cell stack using a fluoroscopic imaging apparatus.

4. The battery pack manufacturing method according to claim 3, wherein step (c) comprises:
   (i) capturing positions of a maximum protrusion and a minimum protrusion of the lower surface of the cell stack; and
   (ii) calculating a protruding length tolerance between the maximum protrusion and the minimum protrusion.

5. The battery pack manufacturing method according to claim 1, wherein step (c) comprises measuring a length from a determined contour of the lower surface of the cell stack to the free ends of the U-frame.

6. The battery pack manufacturing method according to claim 1, wherein step (c) comprises:
   (i) measuring a plurality of lengths between the flat plate and the lower surface of the cell stack to calculate a correction length (Z'); and
   (ii) multiplying the correction length (Z') by an area of the lower surface of the cell stack.

7. The battery pack manufacturing method according to claim 6, wherein the correction length (Z') is an average of a maximum value and a minimum value calculated by using a tolerance range based on the plurality of lengths between the flat plate and the lower surface of the cell stack, defined by the following formula:

$$Z'=(M0+M1-M2)$$

wherein M0 indicates a distance between a maximum protrusion and a minimum protrusion of the lower surface of the cell stack, M1 indicates a length from the maximum protrusion of the lower surface of the cell stack to the free ends of the opposing sidewalls of the U-frame, and M2 indicates a dimension between a portion of the flat plate opposed to the lower surface of the cell stack, to which the polymer resin is applied, and a portion of the flat plate to which the free ends of the U-frame are coupled,
   wherein, when M0 and M1 have a minimum tolerance according to the tolerance range and M2 has a maximum tolerance according to the tolerance range, Z' indicates the minimum value, and
   wherein, when M0 and M1 have a maximum tolerance according to the tolerance range and M2 has a minimum tolerance according to the tolerance range, Z' indicates the maximum value.

8. The battery pack manufacturing method according to claim 1, wherein step (b) comprises:
   (i) coupling the U-frame and the cell stack to each other such that the U-frame wraps around an upper surface and a side surface of the cell stack, and
   (ii) disposing the cell stack coupled to the U-frame such that a base of the U-frame faces a ground surface.

9. The battery pack manufacturing method according to claim 1, further comprising (e) welding the U-frame and the flat plate to each other.

10. The battery pack manufacturing method according to claim 9, wherein the welding is performed with the flat plate disposed in contact with the free ends of the U-frame by pushing the flat plate downwards.

11. The battery pack manufacturing method according to claim 10, wherein the pushing of the flat plate downwards comprises compressing the U-frame in a direction in which a first sidewall and a second sidewall of the opposing sidewalls of the U-frame face each other.

12. The battery pack manufacturing method according to claim 1, wherein the polymer resin is a thermally conductive polymer resin.

13. The battery pack manufacturing method according to claim 1, wherein step (c) comprises determining a contour of the lower surface of the cell stack.

* * * * *